US012354393B2

(12) United States Patent
Kwok (10) Patent No.: US 12,354,393 B2
(45) Date of Patent: Jul. 8, 2025

(54) WINE LABEL RECOGNITION METHOD, WINE INFORMATION MANAGEMENT METHOD AND APPARATUS, DEVICE, AND STORAGE MEDIUM (71) Applicant: Kit Howard Kwok, Hong Kong (CN)

(72) Inventor: Kit Howard Kwok, Hong Kong (CN)

(*) Notice: Subject to any disclaimer, the term of this patent is extended or adjusted under 35 U.S.C. 154(b) by 260 days.

(21) Appl. No.: 18/127,010

(22) Filed: Mar. 28, 2023

(65) Prior Publication Data

US 2023/0237824 A1 Jul. 27, 2023

Related U.S. Application Data (63) Continuation of application No. PCT/CN2020/123638, filed on Oct. 26, 2020.

(30) Foreign Application Priority Data

Sep. 28, 2020 (CN) .......................... 202011040731.0

(51) Int. Cl.
G06V 30/19 (2022.01)
(52) U.S. Cl.
CPC .... G06V 30/19007 (2022.01); G06V 30/1912 (2022.01); G06V 30/19173 (2022.01)
(58) Field of Classification Search
None
See application file for complete search history.

(56) References Cited

U.S. PATENT DOCUMENTS

| 12,106,587 | B2 * | 10/2024 | Martz | G06V 10/143 |
| 2021/0215657 | A1 * | 7/2021 | Rippee | G06Q 30/0201 |
| 2023/0237824 | A1 * | 7/2023 | Kwok | G06V 10/70 |
| | | | | 382/181 |

(Continued)

FOREIGN PATENT DOCUMENTS

| CN | 109101561 B | * | 10/2021 | |
| WO | WO-2022062028 A1 | * | 3/2022 | G06V 10/70 |

OTHER PUBLICATIONS

Google Patent Translation of CN109101561A, Obtained online on Feb. 8, 2025, Available: https://patents.google.com/patent/CN109101561A/en, Originally published on Dec. 28, 2018. (Year: 2018).*

(Continued)

*Primary Examiner* — Tahmina N Ansari (57) ABSTRACT

A wine label recognition method, a wine information management method and apparatus, a computer device, and a computer-readable storage medium are provided. The method includes: obtaining a wine image, and performing optical character recognition (OCR) on the wine image in a preset OCR manner, to obtain text included in the wine image (S21); performing deep learning recognition on the wine image in a preset deep learning recognition manner, to obtain an image feature included in the wine image (S22); and sifting out a target wine label matching the text and the image feature from a preset wine label database according to the text and the image feature, and using the target wine label as a wine label corresponding to the wine image (S33). Advantages of deep learning and OCR are fully utilized thereby improving accuracy and efficiency of wine label recognition and improving automation efficiency of wine information management.

3 Claims, 3 Drawing Sheets (56) References Cited

U.S. PATENT DOCUMENTS

2023/0245475 A1* 8/2023 Martz ................ G01N 21/3577
382/103

OTHER PUBLICATIONS

PCT search report and written search opinion for PCT/CN2020/123638—WO2022062028, Made available online Mar. 28, 2023, Available online at https://patentscope.wipo.int/search/en/detail.jsf?docId=WO2022062028&_cid=P12-M6WAHE-81615-1 (Year: 2023).*

* cited by examiner

WINE LABEL RECOGNITION METHOD, WINE INFORMATION MANAGEMENT METHOD AND APPARATUS, DEVICE, AND STORAGE MEDIUM

CROSS-REFERENCE TO RELATED APPLICATIONS

This application is based on and claims priority to Chinese Patent Application 202011040731.0, filed on Sep. 28, 2020, the entire content of which is hereby incorporated into this application as a whole.

TECHNICAL FIELD

This application relates to the technical field of wine information management, and in particular, to a wine label recognition method, a wine information management method and apparatus, a computer device, and a computer-readable storage medium.

BACKGROUND

Alcohol has played an important role in socializing since ancient times, and wine, for example, is playing an increasingly important role in modern socializing. Alcohol is usually stored in a cellar. In terms of alcohol storage, specific environment conditions are required for the cellar. In addition, alcohol products in the cellar need to be managed. For example, the storage of wines has extremely high requirements on temperature and humidity, especially. Moreover, due to limited cellar functions of conventional wine cellars, wines stored in the cellars are mainly managed manually, leading to relatively low wine management efficiency.

SUMMARY

This application provides a wine label recognition method, a wine information management method and apparatus, a computer device, and a computer-readable storage medium, which can resolve the problem of relatively low accuracy of wine label recognition in the conventional technology, thereby resolving the problem of relatively low efficiency in automated management of wines in the conventional technology.

According to a first aspect, this application provides a wine label recognition method, where the method includes: obtaining a wine image, and performing optical character recognition (OCR) on the wine image in a preset OCR manner, to obtain text included in the wine image; performing deep learning recognition on the wine image in a preset deep learning recognition manner, to obtain an image feature included in the wine image; and sifting out a target wine label matching the text and the image feature from a preset wine label database according to the text and the image feature, and using the target wine label as a wine label corresponding to the wine image.

According to a second aspect, this application provides a wine information management method applied to a server side, where the method includes: obtaining wine information, where the wine information includes a wine image; performing recognition on the wine image according to the wine label recognition method to obtain a wine label included in the wine image; and managing the wine information based on the wine label.

According to a third aspect, this application provides a wine information management method applied to a terminal, where the method includes: sending a wine information obtaining request to a preset server in response to an operation of a user, so that the preset server obtains target wine information corresponding to the wine information obtaining request according to the wine information obtaining request, and returns the target wine information to the terminal, where the target wine information includes wine information associated based on a preset wine label, and the preset wine label is obtained by performing recognition on a wine image according to the wine label recognition method; receiving the target wine information sent by the preset server; and displaying the target wine information, so that the user obtains the target wine information.

According to a fourth aspect, this application further provides a wine label recognition apparatus, including: a first recognition unit, configured to obtain a wine image, and perform OCR on the wine image in a preset OCR manner, to obtain text included in the wine image; a second recognition unit, configured to perform deep learning recognition on the wine image in a preset deep learning recognition manner, to obtain an image feature included in the wine image; and a first screening unit, configured to sift out a target wine label matching the text and the image feature from a preset wine label database according to the text and the image feature, and use the target wine label as a wine label corresponding to the wine image.

According to a fifth aspect, this application further provides a wine information management apparatus applied to a server side, including: an obtaining unit, configured to obtain wine information, where the wine information includes a wine image; a third recognition unit, configured to perform recognition on the wine image according to the wine label recognition method to obtain a wine label included in the wine image; and a management unit, configured to manage the wine information based on the wine label.

According to a sixth aspect, this application further provides a wine information management apparatus applied to a terminal, including: a sending unit, configured to send a wine information obtaining request to a preset server in response to an operation of a user, so that the preset server obtains target wine information corresponding to the wine information obtaining request according to the wine information obtaining request, and returns the target wine information to the terminal, where the target wine information includes wine information associated based on a preset wine label, and the preset wine label is obtained by performing recognition on a wine image according to the wine label recognition method; a receiving unit, configured to receive the target wine information sent by the preset server; and a display unit, configured to display the target wine information, so that the user obtains the target wine information.

According to a seventh aspect, this application further provides a computer device, including a memory and a processor, where the memory stores a computer program, and the processor executes the computer program to perform the steps in the wine label recognition method, or perform the steps in the wine information management method applied to the server side, or perform the steps in the wine information management method applied to the terminal.

According to an eighth aspect, this application further provides a computer-readable storage medium, where the computer-readable storage medium stores a computer program, and the computer program, when executed by a processor, causes the processor to implement the steps in the wine label recognition method, or implement the steps in the wine information management method applied to the server side, or implement the steps in the wine information management method applied to the terminal.

This application provides a wine label recognition method, a wine information management method and apparatus, a computer device, and a computer-readable storage medium. According to this application, a wine image is obtained, and OCR is performed on the wine image in a preset OCR manner, to obtain text included in the wine image; deep learning recognition is performed on the wine image in a preset deep learning recognition manner, to obtain an image feature included in the wine image; and a target wine label matching the text and the image feature is sifted out from a preset wine label database according to the text and the image feature, and the target wine label is used as a wine label corresponding to the wine image. In this application, OCR text recognition and deep learning image recognition are combined to implement automatic recognition of a wine label based on machine vision. Due to the full integration of advantages of OCR optical recognition and deep learning recognition, advantages of OCR text recognition for fast and accurate recognition of normative characters can be fully utilized to quickly recognize characters with normative fonts included in the wine image, and advantages of deep learning for image recognition are utilized to overcome the disadvantages of OCR text recognition for wine label text recognition in a complex environment where the wine is located. Further, advantages of accuracy of deep learning for image recognition can be fully utilized to achieve favorable compatibility with multinational languages and characters with the help of deep learning recognition of machine vision, and advantages of OCR text recognition for normative character recognition are fully utilized to narrow the search range of deep learning, thereby overcoming disadvantages of deep learning for wine label image recognition with extremely high requirements on the amount of training data and a relatively large amount of calculation. In addition, wine label image recognition based on deep learning needs to search from only a relatively small target wine label range after OCR text recognition, reducing the demand of a system on computing resources, so that wine labels of wines can be efficiently and accurately recognized in real time, thereby improving accuracy and efficiency of the recognition of the wine labels of the wines. Based on the accurate recognition of the wine labels, automated management of wines in a cellar is achieved, and efficiency of automated management of wines is improved. For example, in a cellar where wines are stored, the wines can be managed in real time automatically with high quality, thereby improving the efficiency of automated management of wines.

BRIEF DESCRIPTION OF THE DRAWINGS

To describe the technical solutions in the embodiments of this application more clearly, the accompanying drawings required for describing the embodiments are briefly described below. Apparently, the accompanying drawings in the following description show some embodiments of this application. A person of ordinary skill in the art may still derive other accompanying drawings from the accompanying drawings without creative efforts.

DETAILED DESCRIPTION

The technical solutions in the embodiments of this application are clearly and completely described below with reference to the accompanying drawings in the embodiments of this application. Apparently, the described embodiments are some rather than all of the embodiments of this application. All other embodiments obtained by a person of ordinary skill in the art based on the embodiments of this application without creative efforts fall within the protection scope of this application.

It should be understood that the terms "comprise" and "include" used in this specification and the appended claims indicate the presence of the described features, integers, steps, operations, elements and/or components, but do not exclude the presence or addition of one or more other features, integers, steps, operations, elements, components and/or combinations thereof.

Figure 1:
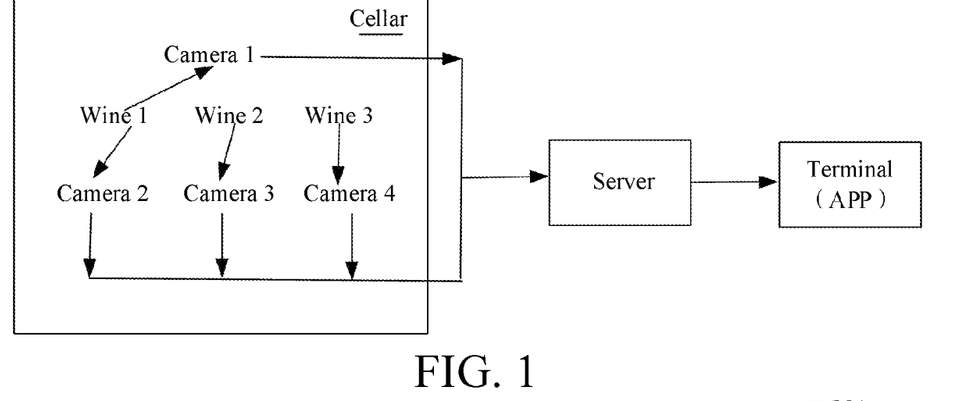
FIG. 1 is an application environment diagram of a wine label recognition method according to an embodiment of this application.

FIG. 1 is an application environment diagram of a wine label recognition method according to an embodiment of this application. As shown in FIG. 1, the application environment includes: (1) Cellar. A plurality of cameras are arranged at different locations in the cellar. As shown in FIG. 1, the exemplary cellar is provided with a camera 1, a camera 2, a camera 3, and a camera 4, to photograph wines in the cellar. Still referring to the figure, as shown in FIG. 1, in this example, a wine 1, a wine 2, and a wine 3 are included, the camera 1 and the camera 2 are used for photographing the wine 1, the camera 3 is used for photographing the wine 2, and the camera 4 is used for photographing the wine 3. The wines may be stored in a wine cabinet, or may be wines at the entrance and exit of the cellar. In this case, a camera needs to be arranged at the entrance and exit of the cellar to photograph the wines entering and exiting the cellar with the camera at the entrance and exit of the cellar to perform automated management on the wines. (2) Server. The server is configured to receive a wine image that corresponds to a wine and that is captured and uploaded by a camera, perform wine label recognition on the wine image, and manage, according to a wine label recognition result corresponding to the wine label recognition, wine information of the wine corresponding to the wine image. (3) Terminal. The terminal is configured to receive an operation such as querying, edition, or deletion performed by a user on the wine information corresponding to the wine, and obtain the wine information corresponding to the operation of the user from the server in response to the operation of the user. The operation can be performed on the wine information through a wine information management APP installed on the terminal.

The operation process of the foregoing main bodies is as follows: (1) A camera in the cellar captures a wine image corresponding to a wine in the cellar, and uploads the wine image to the server. For example, in FIG. 1, the camera 1 and the camera 2 capture a wine image 1 corresponding to the wine 1, the camera 3 captures a wine image 2 corresponding to the wine 2, the camera 4 captures a wine image 3 corresponding to the wine 3, and the cameras 1 to 4 upload the wine image 1, the wine image 2, and the wine image 3 to the server. (2) The server receives wine information, where the wine information includes a wine image. For example, the server receives the wine image 1, the wine image 2, or the wine image 3. After obtaining the wine image, the server performs OCR on the wine image in a preset OCR manner, to obtain text included in the wine image; performs deep learning recognition on the wine image in a preset deep learning recognition manner, to obtain an image feature included in the wine image; sifts out a target wine label matching the text and the image feature from a preset wine label database according to the text and the image feature; and uses the target wine label as a wine label corresponding to the wine image. Based on the recognized wine label, the server performs wine information management such as recording, deletion, or edition on the wine information of the wine corresponding to the wine image. (3) A wine information obtaining request is sent to a preset server in response to an operation of a user, so that the preset server obtains target wine information corresponding to the wine information obtaining request according to the wine information obtaining request, where the target wine information includes wine information associated based on a preset wine label, and the preset wine label is obtained by performing recognition on a wine image according to the wine label recognition method. The target wine information is returned to the terminal, the target wine information sent by the preset server is received, and the target wine information is displayed, so that the user obtains the target wine information.

Figure 2:
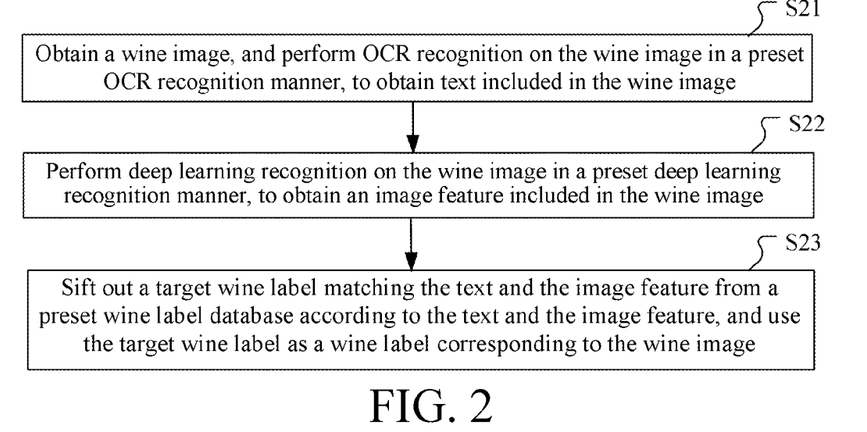
FIG. 2 is a schematic flowchart of a wine label recognition method according to an embodiment of this application.

FIG. 2 is a schematic flowchart of a wine label recognition method according to an embodiment of this application. As shown in FIG. 2, the method includes the following steps S21 to S23:

S21. Obtain a wine image, and perform OCR on the wine image in a preset OCR manner, to obtain text included in the wine image.

OCR, which is optical character recognition in English, refers to conversion of text in a document into a black and white dot matrix image file in an optical manner, and conversion of text in an image into a text format through recognition software.

Specifically, to perform wine label recognition, a user may capture a wine image corresponding to a wine by using an image capturing device with a camera such as a smartphone, or a camera arranged in the cellar may capture a wine image in cellar, and upload the wine image to a computer device for performing the wine label recognition, so that the computer device obtains a wine image to be recognized. Subsequently, the computer device performs OCR on the wine image in a preset OCR manner to extract text included in the wine image and uses the text as target text. The OCR technology is good at recognizing character-based content such as normative text. Therefore, the text included in the wine image can be accurately recognized. For example, during automated wine label recognition of wines in a wine cellar for management of wine information of the wines, in the wine cellar, wine images of the wines may be captured with a plurality of cameras deployed in the wine cellar, where the wine image may be a single image captured through a camera (that is, a picture format screen), and the wine image is uploaded to a backend wine information server. Alternatively, a video may be captured through a camera, and the video captured by the camera is uploaded to a backend wine information server. Subsequently, a video frame in the video is extracted to obtain an image. The backend wine information server performs OCR on the wine image in a preset OCR manner, to obtain text included in the wine image, and uses the text as target text corresponding to the wine label. In addition, in another application scenario, during management of wine information of a wine, a wine label video of the wine may be captured with a camera of a mobile phone, and an image included in the wine label video is extracted to obtain a wine label image of the wine. Alternatively, a wine label image of the wine may be directly captured, and OCR is performed on the wine label image of the wine in a preset OCR manner, to obtain text included in the wine label image of the wine, and the text is used as target text.

Further, before the step of obtaining a wine image, the method further includes:

obtaining an initial wine image corresponding to the wine image; and segmenting the initial wine image to obtain a wine image corresponding to a partial image including a preset wine label in the initial wine image.

Specifically, there is a high probability that different objects, or different parts of the same object, for example, a wine and an ambient environment, or different wines, or different parts of the same wine, are different in brightness, texture, color, and other image features. In view of this, because wines that need to be managed fall within a preset wine range, and wine labels that need to be recognized fall within a preset wine label range, before the step of automatically recognizing a wine label, an obtained initial wine image corresponding to the wine image may be segmented after the initial wine image is obtained and before the wine label is automatically recognized, to intelligently segment images of other parts in the wine, such as an environment image other than the wine and an image of a part of the wine other than the wine label such as a wine bottle included in the initial wine image. The segmented partial image including the preset wine label is used as an approximate location of the target wine label image, and the target wine label image is used as a wine image for wine label recognition. Focusing an image for recognition on the partial image including the wine label, especially in a complex environment such as a cellar that includes many environmental factors, can accurately recognize the wine image corresponding to the wine bottle, to obtain a corresponding accurate image feature, so that the accuracy of subsequent wine label recognition can be improved, and the amount of data processing is reduced compared to the recognition of the entire initial wine image, thereby improving the efficiency of wine label recognition.

Further, after the step of segmenting the initial wine image, the method further includes:

determining whether the initial wine image includes a preset wine label; and if the initial wine image includes a preset wine label, performing the step of obtaining a wine image corresponding to a partial image including a preset wine label in the initial wine image; or if the initial wine image includes no preset wine label, prompting an error of the initial wine image.

Specifically, there is a high probability that different objects, or different parts of the same object, for example, a wine and an ambient environment, or different wines, or different parts of the same wine, are different in brightness, texture, color, and other image features. Therefore, an image feature corresponding to a partial image including a wine label on each wine is unique. In terms of image features, an image feature corresponding to a partial image of a wine bottle including a wine label is unique and obvious. After the initial wine image is segmented, it may be preliminarily determined, according to an image feature obtained by segmenting the initial wine image, in combination with a preset obvious wine label image feature corresponding to the partial image including the wine label, whether the initial wine image includes a preset wine label. If the initial wine image includes a preset wine label, the step of obtaining a wine image corresponding to a partial image in the initial wine image that includes the preset wine label is performed, to perform a more detailed image recognition on the initial wine image to obtain through recognition the wine label included in the initial wine image. If the initial wine image does not include the preset wine label, for example, the image may be a wine bottle image, a wine bottle cap image, or other images of other parts of the wine bottle that do not include the wine label, or the image is a non-wine label image such as a face image, a wine cabinet image, or an ambient environment image, there is no need to further process the initial wine image, and an error of the initial wine image is prompted to indicate that the initial wine image is not a required image and can be discarded. Because the amount of image data corresponding to the image feature corresponding to the partial image of the wine bottle that includes the wine label is relatively small, if the initial wine image does not include the preset wine label, a recognition result of the wine image can be obtained as soon as possible without responsible processing of the initial wine image with a large amount of image data, thereby shortening the procedure of wine label recognition. In this way, the efficiency of wine label image recognition can be improved, and a prompt to recapture the initial wine image can be issued, thereby improving the processing efficiency of wine label recognition.

S22. Perform deep learning recognition on the wine image in a preset deep learning recognition manner, to obtain an image feature included in the wine image.

Deep learning is to establish and simulate a neural network of a human brain for analysis and learning, which imitates the mechanism of the human brain to interpret data. Models of deep learning include Feed forward neural networks (FF or FFNN) and perceptrons (P), Boltzmann machines (BM), and the like. A deep learning model with a better effect on wine label recognition can be selected from many deep learning models by testing samples.

Specifically, after the wine image is obtained, deep learning recognition is performed on the wine image in the preset deep learning recognition manner. Because deep learning is feature learning (or referred to as representation learning), which is a type of feature engineering, the image feature included in the wine image can be obtained through deep learning. Because deep learning is good at learning training sample images and tags corresponding to the training sample images, a pre-trained deep learning-based deep learning model is good at recognizing image features. In this way, the image feature included in the wine image can be accurately recognized, and the image feature is used as a target image feature corresponding to the wine image. For example, during automatic recognition of wine labels of wines to manage wine information of the wines, after a wine image corresponding to a wine is obtained, deep learning recognition is performed on the wine image in the preset deep learning recognition manner, to recognize an image feature included in the wine image, and the image feature is used as a target image feature corresponding to the wine image.

The process of training a preset deep learning model corresponding to the preset deep learning recognition manner includes the following steps:

(1) Tag a wine label image corresponding to a preset wine, to obtain a wine label image pre-training sample, where the wine label image pre-training sample includes the training wine label image and a training wine label tag corresponding to the training wine label image. Specifically, a wine label image of a wine label corresponding to a wine that needs to be managed is captured, especially wine label images of the wine are captured from various angles, and the captured wine label image is tagged. By tagging, the captured wine label image is correspondingly associated with a wine label name corresponding to the wine label, to indicate that the wine label image corresponds to the wine label name. In this case, the wine label name is the wine label tag corresponding to the wine label image.

(2) Train the preset deep learning model by using the wine label image pre-training sample. Specifically, the wine label image pre-training sample is input into a preset deep learning model, so that the preset deep learning model performs learning automatically according to the training wine label image and a training wine label tag corresponding to the training wine label image, to learn an association relationship between a training image feature corresponding to the training wine label image and the training wine label tag, to complete the training of the deep learning model.

(3) Test the preset deep learning model by using a wine label image test sample, where the wine label image test sample includes the test wine label image and a test wine label tag corresponding to the test wine label image. Specifically, the trained preset deep learning model is tested by using the wine label image test sample, and the preset deep learning model performs recognition on the test wine label image, to obtain a test target wine label. The test target wine label is compared with the test wine label tag corresponding to the test wine label image, to determine whether the test target wine label is consistent with the test wine label tag corresponding to the test wine label image. If the test target wine label is consistent with the test wine label tag corresponding to the test wine label image, it indicates that the deep learning model has a relatively accurate recognition effect on the recognition of the preset wine label. If the test target wine label is inconsistent with the test wine label tag corresponding to the test wine label image, it indicates that the deep learning model does not have a relatively accurate recognition effect on the recognition of the preset wine label. In this case, it is determined whether the preset deep learning model achieves an expected goal. If the expected goal is achieved, the preset deep learning model is put into a production environment. If the expected goal is not achieved, more training samples are used, the training samples are adjusted, and the preset deep learning model is adjusted to perform training again, until the preset deep learning model finally achieves the expected goal.

S23. Sift out a target wine label matching the text and the image feature from a preset wine label database according to the text and the image feature, and use the target wine label as a wine label corresponding to the wine image.

Specifically, during wine label recognition, a range of wine labels may be predetermined, for example, categories of wines existing in the cellar may be predetermined. Therefore, wine labels corresponding to wines that need to be managed may be combined to form a preset wine label database. After text and an image feature included in a wine image are extracted from the wine image, the text and the image feature may be combined according to the text and the image feature, to sift out a wine label matching the text and the image feature from the preset wine label database as a target wine label, and the target wine label is used as a wine label corresponding to the wine image. In this way, the wine label corresponding to the wine image is recognized, and wine information is automatically managed according to the recognized wine label. For example, during management of wine information through a wine cellar, after a wine image is obtained, text and an image feature in the wine image are recognized, and a wine label corresponding to the wine image is recognized according to the text and the image feature. Then, the wine information of the wine is managed according to the recognized wine label.

In this embodiment of this application, a wine label usually includes text and an image, and different wine labels differ greatly. Especially in terms of wine labels, wine labels of wines produced by different manufacturers have large font differences in font type, character size, language, and the like. In a complex cellar environment condition especially, with many wine label differences such as multinational languages, during unified automated management of wines, when wine labels are automatically recognized based only on OCR in the conventional technology, in addition to font differences, there is also a problem of poor compatibility with multinational characters, leading to an unstable recognition effect due to the low accuracy of wine label text recognition. The conventional deep learning technology has an excessive demand for training sample data to train a relatively accurate deep learning recognition model, and image recognition based on the deep learning technology requires a large amount of calculation. Therefore, in case of insufficient training samples, the efficiency of wine label recognition is relatively low. However, generally, for an application environment of wine information management, it is difficult to accumulate a sufficiently large wine label training data sample. Therefore, it is difficult for a computer device to recognize various types of wine labels accurately. The applicant of the embodiments of this application is faced with the need for unified and accurate recognition of various wine labels with great differences in a complex environment, and combines OCR text recognition and deep learning image recognition to achieve machine vision-based automated recognition of wine labels based on the characteristics of wine labels consisting of text and images. Due to the full integration of advantages of OCR optical recognition and deep learning recognition, advantages of OCR text recognition for fast and accurate recognition of normative characters can be fully utilized to quickly recognize characters with normative fonts included in the wine image. Further, advantages of accuracy of deep learning for image recognition can be fully utilized, with the help of deep learning recognition of machine vision, advantages of deep learning for image recognition are utilized to overcome the disadvantages of OCR text recognition, and favorable compatibility with multinational languages and characters is achieved, thereby fulling utilizing advantages of OCR text recognition to narrow the search range of deep learning, to overcome disadvantages of deep learning for image recognition with extremely high requirements on the amount of training data and a relatively large amount of calculation. In addition, the image recognition based on deep learning needs to search from only a relatively small search range, so that a network structure of the deep learning model can be optimized, and the demand of a system on computing resources can be reduced, thereby proposing a process of rough to fine and accurate intelligent recognition of various wine labels by combining OCR and deep learning recognition and integrating the recognition results of the two recognition manners. In this way, the speed and accuracy of wine label recognition can be improved, especially for a case that there are large multilingual differences in wine labels and the amount of wine label training sample data cannot be sufficiently large, to meet the requirement of wine label recognition on training in deep learning, so that wine labels can be recognized in real time efficiently and accurately, thereby improving the accuracy and efficiency of wine label recognition.

In one embodiment, the step of sifting out a target wine label matching the text and the image feature from a preset wine label database according to the text and the image feature, and using the target wine label as a wine label corresponding to the wine image includes:

sifting out preset wine labels matching the text from the preset wine label database according to the text, and combining the preset wine labels into a collection to obtain a target wine label collection; and sifting out a wine label with a highest matching degree with the image feature from the target wine label collection according to the image feature as the target wine label, and using the target wine label as a wine label corresponding to the wine image.

Specifically, after text included in an image is extracted from the image through OCR, preset wine labels matching the text are sifted out from the preset wine label database according to the text, and the preset wine labels are combined into a collection to obtain a target wine label collection, to fully utilize advantages of rapid and accurate recognition of OCR for normative characters to narrow a wine label searching range of deep learning to the target wine label collection.

Further, generally, because a wine label is a combination of text and images, or the recognized text is inaccurate, for example, the recognized text is similar, identical, or included in other text combinations, it is impossible to accurately determine the wine label corresponding to the wine image by using only the recognized text. In this case, a wine label with a highest matching degree with the image feature may be sifted out from the target wine label collection as the target wine label according to the image feature after the target wine label collection is obtained, that is, a wine label best matching the image feature is sifted out from the target wine label collection as the target wine label, and the target wine label is used as a wine label corresponding to the wine image, thereby recognizing the wine label corresponding to the wine image. Due to the feature that a pre-trained deep learning model is more accurate in image recognition, when a wine label searching range of the deep learning model has been narrowed to the target wine label collection, compared with directly searching from the preset wine label database to obtain the target wine label, the amount of calculation of the deep learning model can be greatly reduced, and the disadvantage of relatively low recognition accuracy of an OCR model for text in a complex environment such as a cellar can be overcome. In this way, an accurate target wine label is sifted out from the target wine label collection, and the accurate wine label corresponding to the wine image can be obtained, thereby improving the accuracy and efficiency of recognizing the wine label corresponding to the wine image.

Further, before the step of sifting out preset wine labels matching the text from the preset wine label database according to the text, and combining the preset wine labels into a collection to obtain a target wine label collection, the method further includes:

counting a text similarity between the text and preset wine label text corresponding to an existing preset wine label in the preset wine label database;

determining whether the text similarity is greater than or equal to a preset text similarity threshold; and using the preset wine label text as target text and using the target text as text corresponding to the wine image if the text similarity is greater than or equal to the preset text similarity threshold.

Still further, the step of using the preset wine label text as target text and using the target text as text corresponding to the wine image if the text similarity is greater than or equal to the preset text similarity threshold includes:

using preset wine label text with the highest text similarity as the target text if the text similarity is greater than or equal to the preset text similarity threshold.

Specifically, a text similarity between the recognized text included in the wine image and the preset wine label text may be determined, the text similarity between the text and the preset wine label text corresponding to the existing preset wine label in the preset wine label database may be counted, and it may be determined whether the text similarity is greater than or equal to the preset text similarity threshold. If the text similarity is greater than or equal to the preset text similarity threshold, it is determined that the text is identical or similar to the preset wine label text, the preset wine label text is used as the target text, and the target text is used as the text corresponding to the wine image. If the text similarity is less than the preset text similarity threshold, it is determined that the text differs greatly from the preset wine label text, a prompt for a wine label recognition error or wine label recognition failure is issued, and a prompt to recapture the wine image may be issued. The target wine label is further filtered by using the preset text similarity threshold, so that the accuracy and efficiency of wine label recognition can be further improved.

Further, because using the preset wine label text as the target text is using the same or similar preset wine label text as the target text, the target text may include a plurality of preset wine label texts. To further narrow a target range of the text and thus reduce a wine label recognition range and improve the efficiency of wine label recognition, the preset wine label text with the highest text similarity may be used as the target text to determine unique target text, so that the range of the target wine label can be narrowed and the efficiency of wine label recognition can be improved.

Further, the step of sifting out a wine label with a highest matching degree with the image feature from the target wine label collection according to the image feature as the target wine label, and using the target wine label as a wine label corresponding to the wine image includes:

counting an image similarity between the image feature and a preset wine label included in the target wine label collection to obtain all image similarities;

sifting out a target image similarity with the highest image similarity among all the image similarities;

determining whether the target image similarity is greater than or equal to a preset image similarity threshold; and using a preset wine label corresponding to the target image similarity as a target wine label and using the target wine label as a wine label corresponding to the wine image if the target image similarity is greater than or equal to the preset image similarity threshold.

Specifically, an image similarity between the recognized image feature included in the wine image and the preset wine label included in the target wine label collection may be determined, an image similarity between the image feature and the preset wine label included in the target wine label collection is counted to obtain all image similarities, a target image similarity with the highest image similarity among all the image similarities is sifted out, and it is determined whether the target image similarity is greater than or equal to a preset image similarity threshold. If the target image similarity is greater than or equal to the preset image similarity threshold, it indicates that the preset wine label corresponding to the target image similarity is identical or similar to the wine label included in the wine image, and the preset wine label corresponding to the target image similarity is used as a target wine label, and the target wine label is used as the wine label corresponding to the wine image. If the target image similarity is less than the preset image similarity threshold, it indicates that the preset wine label corresponding to the target image similarity differs greatly from the wine label included in the wine image, and the wine label included in the wine image cannot be accurately recognized as the target wine label in the preset range, a prompt for a wine label recognition error or wine label recognition failure is issued, and a prompt to recapture the wine image may be issued. The target wine label is further filtered by using the preset image similarity threshold, so that the accuracy of wine label recognition can be further improved.

Figure 3:
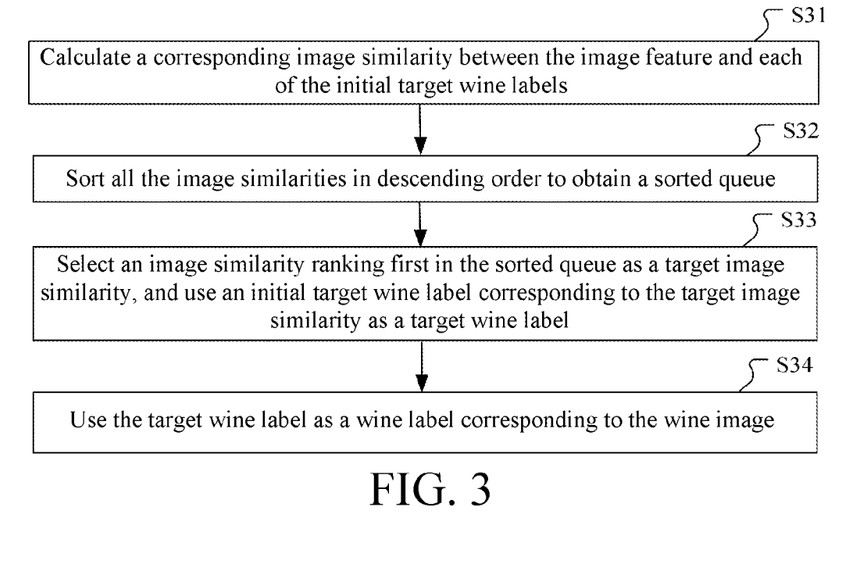
FIG. 3 is a schematic diagram of a first sub flow of a wine label recognition method according to an embodiment of this application.

FIG. 3 is a schematic diagram of a first sub flow of a wine label recognition method according to an embodiment of this application. As shown in FIG. 3, in this embodiment, the target wine label collection includes a plurality of initial target wine labels, and the step of sifting out a wine label with a highest matching degree with the image feature from the target wine label collection according to the image feature as the target wine label, and using the target wine label as a wine label corresponding to the wine image includes:

S31. Calculate a corresponding image similarity between the image feature and each of the initial target wine labels.

S32. Sort all the image similarities in descending order to obtain a sorted queue.

S33. Select an image similarity ranking first in the sorted queue as a target image similarity, and use an initial target wine label corresponding to the target image similarity as a target wine label.

S34. Use the target wine label as a wine label corresponding to the wine image.

Specifically, through sampling and quantization of an image, an image vector may be converted into an image vector. The image feature and each of the initial target wine labels are converted into image vectors, to quantize the image feature and each of the initial target wine labels. Then, a similarity between the two image vectors is calculated, for example, a cosine similarity between the image vectors is calculated, to calculate the corresponding image similarity between image feature and each of the initial target wine labels. After the corresponding image similarity between the image feature and each of the initial target wine labels is obtained, all the image similarities are sorted in descending order, to obtain a sorted queue. Because each image similarity is the corresponding image similarity between the image feature and each of the initial target wine labels, the sorted queue may correspond to ranks used for describing the initial target wine labels. A target image similarity ranking first in the sorted queue is selected, an initial target wine label corresponding to the target image similarity is used as a target wine label, and the target wine label is used as a wine label corresponding to the wine image. In this way, a wine label with the highest matching degree with the image feature is sifted out from the target wine label collection as the target wine label. Because the target wine label collection is already a range of wine labels narrowed by OCR, sifting out the wine label best matching the image feature from the target wine label collection as the target wine label improves the efficiency and accuracy of recognizing the wine label corresponding to the wine image.

In one embodiment, before the step of using an initial target wine label corresponding to the target image similarity as a target wine label, the method further includes:
determining whether the target image similarity is greater than or equal to a preset image similarity threshold; and
if the target image similarity is greater than or equal to the preset image similarity threshold, performing the step of using an initial target wine label corresponding to the target image similarity as a target wine label.

Specifically, to further improve the accuracy of wine label recognition, an image similarity threshold may be further set for the target image similarity to determine whether the target image similarity is greater than or equal to the preset image similarity threshold. If the target image similarity is greater than or equal to the preset image similarity threshold, an initial target wine label corresponding to the target image similarity is used as a target wine label, and the target wine label is used as a wine label corresponding to the wine image, thereby recognizing the wine label corresponding to the wine image. If the target image similarity is less than the preset image similarity threshold, it indicates that the image similarity between the image feature and the wine label in the preset wine label database does not meet a requirement, and there is a relatively great risk of inaccurate recognition. To avoid subsequent disorder of the wine information, the initial target wine label corresponding to the target image similarity is not used as the target wine label. To avoid the confusion of the wine information due to inaccurate wine label recognition, a wine image needs to be re-obtained, automatic wine label recognition needs to be performed on the re-obtained wine image, and a prompt may be issued to recapture a wine image corresponding to a wine label to be recognized. Further, a suggestion for capturing a wine image may be further provided during issuance of the prompt to recapture the wine image corresponding to the wine label. For example, the wine image should include a complete wine label image, and the wine label image needs to be captured from the front.

Figure 4:
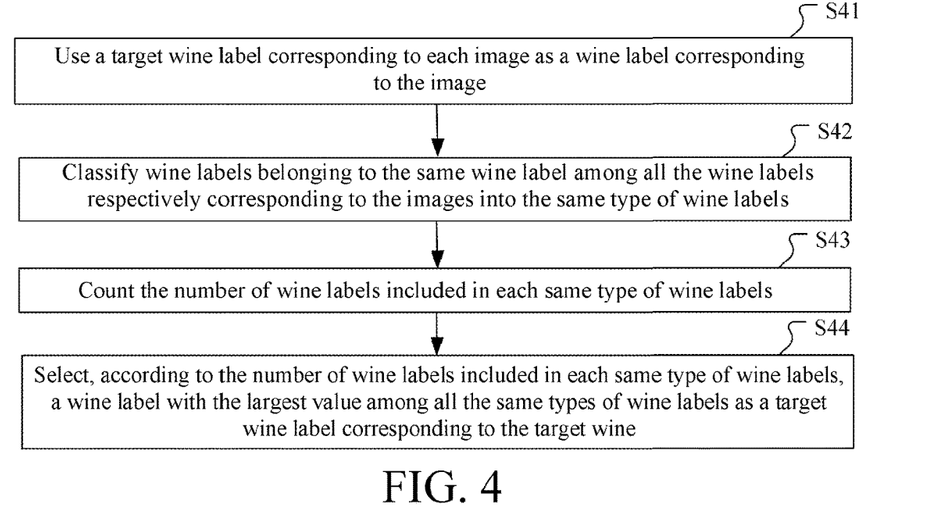
FIG. 4 is a schematic diagram of a second sub flow of a wine label recognition method according to an embodiment of this application.

FIG. 4 is a schematic diagram of a second sub flow of a wine label recognition method according to an embodiment of this application.

As shown in FIG. 4, in this embodiment, the wine image includes a plurality of images of the same target wine, and the step of using the target wine label as a wine label corresponding to the wine image includes:

S41. Use a target wine label corresponding to each image as a wine label corresponding to the image.

After the step of using a target wine label corresponding to each image as a wine label corresponding to the image, the method further includes:

S42. Classify wine labels belonging to the same wine label among all the wine labels respectively corresponding to the images into the same type of wine labels.

S43. Count the number of wine labels included in each same type of wine labels.

S44. Select, according to the number of wine labels included in each same type of wine labels, a wine label with the largest value among all the same types of wine labels as a target wine label corresponding to the target wine.

Specifically, in an application environment, a plurality of images of the same target wine are obtained, the wine label recognition method is performed on each image to obtain a target wine label corresponding to each image, and the target wine label corresponding to each image is used as a wine label corresponding to the image. Then, a target wine label corresponding to the target wine is sifted out from the wine labels corresponding to all the images. Because wine label recognition is separately performed on a plurality of images of the same target wine, and a wine label best meeting a requirement is sifted out as the target wine label corresponding to the target wine, the accuracy of the recognition of the wine label corresponding to the target wine is improved. For example, in a wine management system, cameras are usually mounted at different angles in a wine cellar to photograph the same target wine by using a plurality of cameras. Each camera captures a video and uploads the video to a server backend, so that the server backend extracts a plurality of images of the same target wine from the plurality of videos captured by the plurality of cameras, and separately performs wine label recognition on the plurality of images. Due to different image capturing angles, when recognition is performed on a target wine label corresponding to each image, recognition results may be different for the same target wine, resulting in a case that a plurality of wine labels are obtained through recognition for the same target wine. In this case, a wine label best meeting the expectation needs to be sifted out from all the wine labels respectively corresponding to the images, and the wine label best meeting the expectation is used as the target wine label corresponding to the target wine. For example, a wine label with the highest probability of being recognized is sifted out from the wine labels respectively corresponding to all the images as the wine label best meeting the expectation. Alternatively, considering a similarity between the image and an image of a wine label in the preset wine label database, a wine label whose image has the highest similarity with the image of the wine label in the preset wine label database is sifted out from the wine labels corresponding to all the images as the wine label best meeting the expectation. In this way, the accuracy of recognition of the target wine label corresponding to the target wine can be improved.

Further, in terms of sifting out a wine label with the highest probability of being recognized from the wine labels respectively corresponding to all the images as a wine label that best meets the expectation and that corresponds to the wine image, the wine labels respectively corresponding to all the images can be classified, to classify wine labels belonging to the same wine label among all the wine labels respectively corresponding to the images into the same type of wine labels, to obtain different same types of wine labels. The number of wine labels included in each same type of wine labels is counted, and a wine label type including the largest number of wine labels is used as a target wine label corresponding to the target wine. Because the wine label type including the largest number of wine labels is the corresponding wine label with the highest probability of being recognized, the accuracy of recognition of the target wine label corresponding to the target wine is improved. For example, in a wine management system, during wine label recognition of the same target wine, it is assumed that 50 images are obtained for the same target wine label, where 30 images are recognized as wine label A, 15 images are recognized as wine label B, and five images are recognized as wine label C. In this case, according to the screening manner in which a wine label type including the largest number of wine labels is a corresponding wine label with the largest probability of be recognized, it can be determined that the probability that wine label A is the wine label of the target wine is the highest. In this way, wine label A is determined as the wine label of the target wine.

In one embodiment, the step of obtaining a wine image includes:

receiving a wine image uploaded by a terminal, where the wine image is captured and uploaded by the terminal, and the terminal includes a camera mounted in the cellar in advance.

Specifically, a terminal with a camera such as a smartphone may capture a picture or a video (where a video frame in the video is a wine image), and then the wine image may be uploaded by the terminal to a computer device for wine label recognition. Alternatively, a terminal such as the camera mounted in the cellar in advance captures a wine image. The camera in the cellar may capture a picture or a video (where a video frame in the video is a wine image), and then the wine image may be uploaded to a computer device for wine label recognition, such as the server backend for wine information management.

In one embodiment, the step of capturing and uploading the wine image by the terminal includes:

The wine image includes a plurality of images, the plurality of images are obtained through a plurality of cameras mounted in the preset cellar in advance, and the plurality of cameras are mounted at different preset locations in the cellar.

Specifically, the plurality of cameras mounted in the cellar in advance obtains a plurality of images, and the plurality of cameras are mounted at different preset locations in the cellar, to photograph the same target wine from different angles. In a wine information automatic management system, a photographing device, such as a mobile phone, with a camera may capture a wine image, or may capture wine a video and extract a video frame from the video, to obtain the wine image. Subsequently, the wine image is recognized to achieve automatic wine label recognition, and then wine information of the wine is obtained and managed based on the recognized wine label. In addition, in a wine information automatic management system corresponding to a cellar, such as a wine cellar automatic management system, to achieve wine information automatic management of wines in the cellar, a plurality of cameras are usually mounted in the cellar. The plurality of cameras are mounted at different preset locations in the cellar, to photograph a target wine from different locations or different angles at the same location. The plurality of cameras mounted in advance in the cellar obtain wine pictures or videos, to obtain a plurality of images of wines, and then recognition is performed on the captured wine images, to recognize a wine label of a target wine. Wine information of the target wine is obtained according to the recognized wine label, and then the wine information is processed, to achieve automated management of the target wine.

It should be noted that, in the wine label recognition method described in the foregoing embodiments, technical features included in different embodiments may be recombined as needed, to obtain a combined implementation solution, but all fall within the protection scope claimed by this application.

Figure 5:
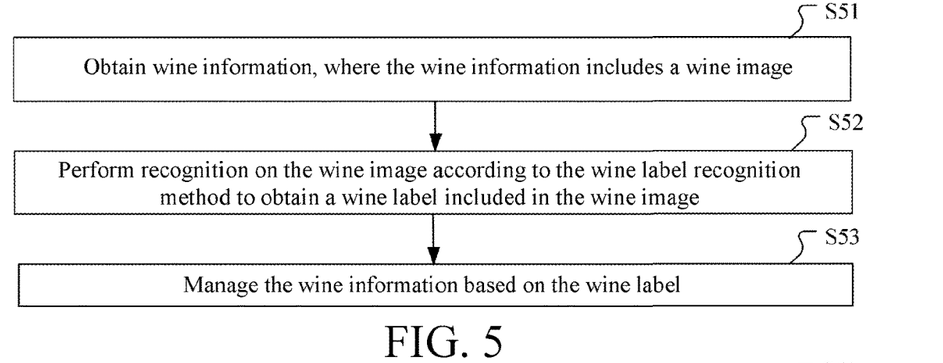
FIG. 5 is a schematic flowchart of a wine information management method applied to a server side according to an embodiment of this application.

FIG. 5 is a schematic flowchart of a wine information management method applied to a server side according to an embodiment of this application. As shown in FIG. 5, the method includes the following steps S51 to S53:

S51. Obtain wine information, where the wine information includes a wine image.

S52. Perform recognition on the wine image according to the wine label recognition method to obtain a wine label included in the wine image.

S53. Manage the wine information based on the wine label.

Specifically, when a server performs automated management on wine information corresponding to a wine, not only a wine image is to be obtained to perform wine label recognition on the wine image according to the wine label recognition method described in the embodiments, to obtain the wine label corresponding to the wine image, but also a wine vintage, a wine origin, a production date, entry and exit times to and from the cellar, and other wine information on other aspects of the wine are to be obtained. In addition, after the wine label corresponding to the wine image is recognized, record operations such as addition, modification, and edition are performed on the wine information based on the wine label, to implement automated management of the wine. Due to the improvement of the accuracy and efficiency of the recognition of wine labels of wines, based on the accurate and rapid recognition of the wine labels, during automated management of wines in a cellar, efficiency and accuracy of automated management of the wines can also be improved. For example, in a cellar where wines are stored, due to accurate and rapid recognition of wine labels of the wines, the wines can be managed in real time automatically with high quality, thereby improving the efficiency of automated management of wines.

Figure 6:
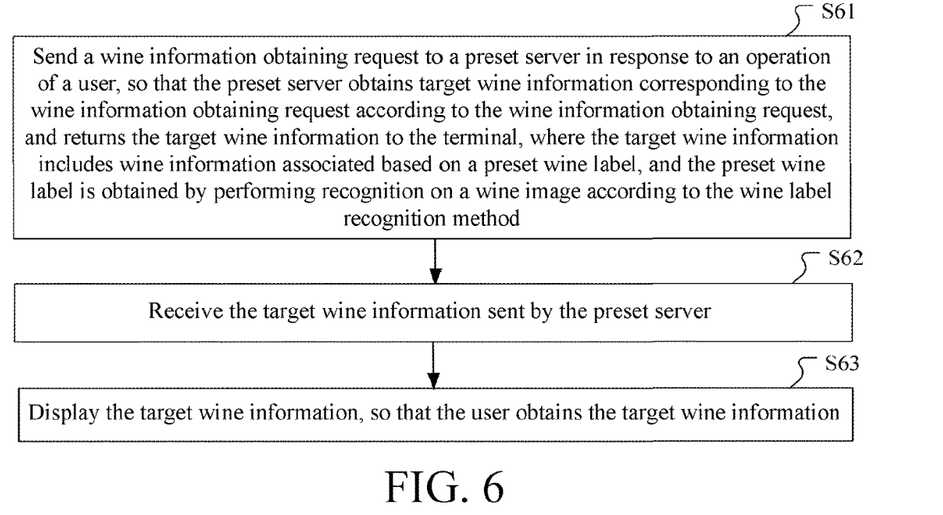
FIG. 6 is a schematic flowchart of a wine information management method applied to a terminal according to an embodiment of this application.

FIG. 6 is a schematic flowchart of a wine information management method applied to a terminal according to an embodiment of this application. As shown in FIG. 6, the method includes the following steps S61 to S63:

S61. Send a wine information obtaining request to a preset server in response to an operation of a user, so that the preset server obtains target wine information corresponding to the wine information obtaining request according to the wine information obtaining request, and returns the target wine information to the terminal, where the target wine information includes wine information associated based on a preset wine label, and the preset wine label is obtained by performing recognition on a wine image according to the wine label recognition method.

S62. Receive the target wine information sent by the preset server.

S63. Display the target wine information, so that the user obtains the target wine information.

Specifically, when a user performs an edit operation such as querying, modification, addition, or deletion on the wine information through a terminal, the terminal sends a wine information obtaining request to a preset server in response to an operation of the user, so that the preset server obtains target wine information corresponding to the wine information obtaining request according to the wine information obtaining request, where the target wine information includes wine information associated based on a preset wine label, and the preset wine label is obtained by performing recognition on a wine image according to the wine label recognition methods described in the foregoing embodiments, and returns the target wine information to the terminal. The terminal receives the target wine information sent by the preset server, and displays the target wine information, so that the user obtains the target wine information. Due to the improvement of the accuracy and efficiency of the recognition of wine labels of wines, based on the accurate and rapid recognition of the wine labels, during automated management of wines in a cellar, it also helps a user improve efficiency, accuracy, and convenience of automated management of the wines. For example, in a cellar where wines are stored, due to accurate and rapid recognition of wine labels of the wines, the wines can be managed in real time automatically with high quality, thereby improving the efficiency, convenience, and management quality of automated management of wines compared with the manual management of wines in a cellar in the conventional technology.

Figure 7:
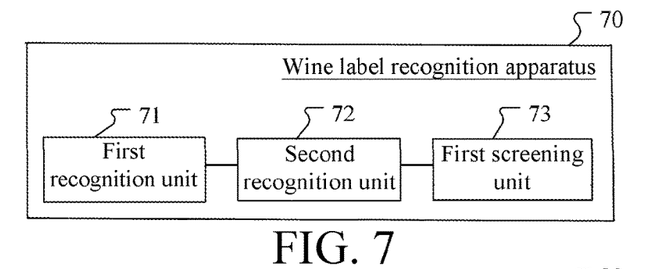
FIG. 7 is a schematic block diagram of a wine label recognition apparatus according to an embodiment of this application.

FIG. 7 is a schematic block diagram of a wine label recognition apparatus according to an embodiment of this application. Corresponding to the wine label recognition method described above, an embodiment of this application further provides a wine label recognition apparatus. As shown in FIG. 7, the wine label recognition apparatus includes units used for performing the wine label recognition method described above. The wine label recognition apparatus may be configured in a computer device such as a server. Specifically, referring to FIG. 7, the wine label recognition apparatus 70 includes a first recognition unit 71, a second recognition unit 72, and a first screening unit 73.

The first recognition unit 71 is configured to obtain a wine image, and perform OCR on the wine image in a preset OCR manner, to obtain text included in the wine image. The second recognition unit 72 is configured to perform deep learning recognition on the wine image in a preset deep learning recognition manner, to obtain an image feature included in the wine image. The first screening unit 73 is configured to sift out a target wine label matching the text and the image feature from a preset wine label database according to the text and the image feature, and use the target wine label as a wine label corresponding to the wine image.

In one embodiment, the first screening unit 73 includes: a first screening subunit, configured to sift out preset wine labels matching the text from the preset wine label database according to the text, and combine the preset wine labels into a collection to obtain a target wine label collection; and a second screening subunit, configured to sift out a wine label with a highest matching degree with the image feature from the target wine label collection according to the image feature as the target wine label, and use the target wine label as a wine label corresponding to the wine image.

In one embodiment, the wine image includes a plurality of images of the same target wine, and the first screening unit 73 is configured to sift out a target wine label matching the text and the image feature from a preset wine label database according to the text and the image feature that correspond to each image, and use a target wine label corresponding to each image as a wine label corresponding to the image.

The wine label recognition apparatus 70 further includes: a classification unit, configured to classify wine labels belonging to the same wine label among all the wine labels respectively corresponding to the images into the same type of wine labels; a statistical unit, configured to count the number of wine labels included in each same type of wine labels; and a second screening unit, configured to select, according to the number of wine labels included in each same type of wine labels, a wine label with the largest value among all the same types of wine labels as a target wine label corresponding to the target wine.

Figure 8:
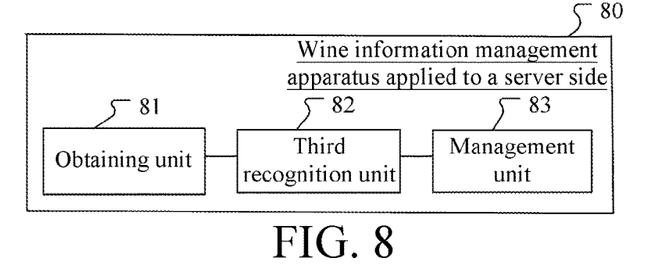
FIG. 8 is a schematic block diagram of a wine information management apparatus applied to a server side according to an embodiment of this application.

FIG. 8 is a schematic block diagram of a wine information management apparatus applied to a server side according to an embodiment of this application. Corresponding the wine information management method applied to a server side described above, an embodiment of this application further provides a wine information management apparatus applied to a server side. As shown in FIG. 8, the wine information management apparatus 80 applied to a server side includes units used for performing the wine information management method applied to a server side described above. The wine information management apparatus 80 may be configured in a computer device such as a server. Specifically, referring to FIG. 8, the wine information management apparatus 80 includes an obtaining unit 81, a third recognition unit 82, and a management unit 83.

The obtaining unit 81 is configured to obtain wine information, where the wine information includes a wine image. The third recognition unit 82 is configured to perform recognition on the wine image according to the wine label recognition method to obtain a wine label included in the wine image. The management unit 83 is configured to manage the wine information based on the wine label.

Figure 9:
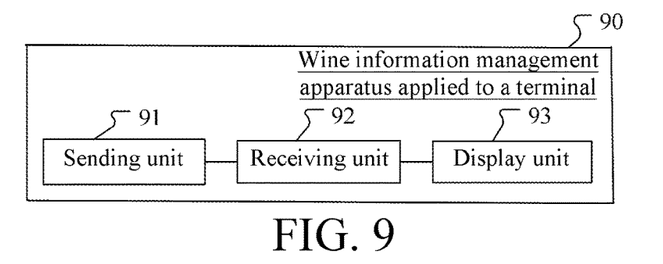
FIG. 9 is a schematic block diagram of a wine information management apparatus applied to a terminal according to an embodiment of this application.

FIG. 9 is a schematic block diagram of a wine information management apparatus applied to a terminal according to an embodiment of this application. Corresponding the wine information management method applied to a terminal described above, an embodiment of this application further provides a wine information management apparatus applied to a terminal. As shown in FIG. 9, the wine information management apparatus 90 applied to a terminal includes units used for performing the wine information management method applied to a terminal described above. The wine information management apparatus 90 may be configured in a terminal device such as a smartphone. Specifically, referring to FIG. 9, the wine information management apparatus 90 includes a sending unit 91, a receiving unit 92, and a display unit 93.

The sending unit 91 is configured to send a wine information obtaining request to a preset server in response to an operation of a user, so that the preset server obtains target wine information corresponding to the wine information obtaining request according to the wine information obtaining request, and returns the target wine information to the terminal, where the target wine information includes wine information associated based on a preset wine label, and the preset wine label is obtained by performing recognition on a wine image according to the wine label recognition method. The receiving unit 92 is configured to receive the target wine information sent by the preset server. The display unit 93 is configured to display the target wine information, so that the user obtains the target wine information.

In an application example, the wine information management method applied to a server side and the wine information management method applied to a terminal may be used together in a wine information management system. The system includes a cellar, a terminal, and a server. The cellar is provided with a wine cabinet. The wine cabinet is used for placement of a wine. A camera is provided at a preset location in the cellar, to photograph a wine image corresponding to the wine through the camera, and upload the wine image to the server. The server is configured to perform the steps in the wine information management method applied to a server side described in the embodiments above. The terminal is configured to perform the steps in the wine information management method applied to a terminal described in the embodiments above.

It should be noted that, a person skilled in the art may clearly understand that, for specific implementation processes of the wine label recognition apparatus and the units, specific implementation processes of the wine information management apparatus applied to a server side and the units, and specific implementation processes of the wine information management apparatus applied to a terminal and the units, reference may be made to the corresponding descriptions in the respective corresponding method embodiments in the foregoing embodiments. For convenience and brevity of description, details are not described herein again.

In addition, the division and connection of the units in the wine label recognition apparatus, the wine information management apparatus applied to a server side, or the wine information management apparatus applied to a terminal are used for illustrative purposes only. In other embodiments, the wine label recognition apparatus, the wine information management apparatus applied to a server side, or the wine information management apparatus applied to a terminal may be divided into different units as needed, or the units in the wine label recognition apparatus, the wine information management apparatus applied to a server side, or the wine information management apparatus applied to a terminal may be connected in different orders and manners, to complete all or some functions of the wine label recognition apparatus, the wine information management apparatus applied to a server side, or the wine information management apparatus applied to a terminal.

The wine label recognition apparatus, the wine information management apparatus applied to a server side, or the wine information management apparatus applied to a terminal each may be implemented in the form of a computer program. The computer program may run on a computer device shown in FIG. 10.

Figure 10:
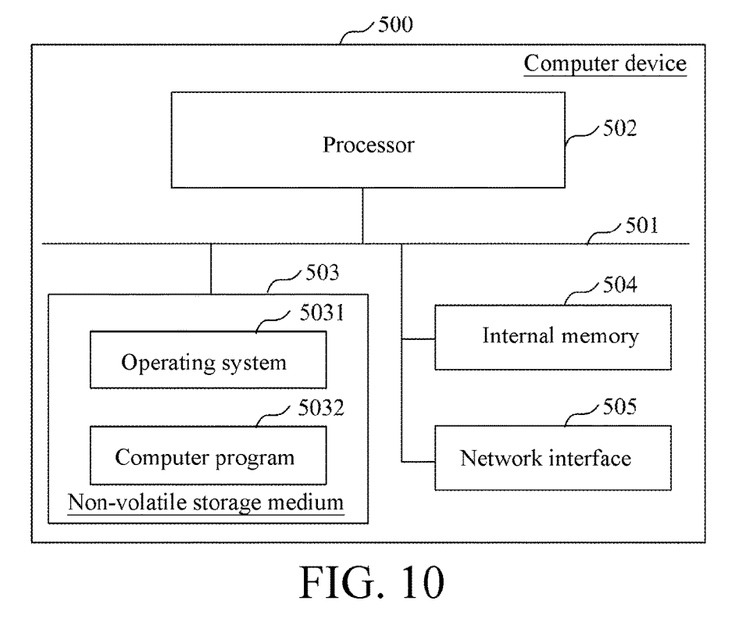
FIG. 10 is a schematic block diagram of a computer device according to an embodiment of this application.

FIG. 10 is a schematic block diagram of a computer device according to an embodiment of this application. The computer device 500 may be a computer device such as a desktop computer or a server, or may be a component or a member in another device.

Referring to FIG. 10, the computer device 500 includes a processor 502, a memory, and a network interface 505 connected through a system bus 501. The memory may include a non-volatile storage medium 503 and an internal memory 504, or the memory may be a volatile computer-readable storage medium.

The non-volatile storage medium 503 may store an operating system 5031 and a computer program 5032. The computer program 5032, when executed, can cause the processor 502 to perform the wine label recognition method, the wine information management method applied to a server side, or the wine information management method applied to a terminal. The processor 502 is configured to provide computing and control capabilities, to support running of the entire computer device 500. The internal memory 504 provides an environment for the running of the computer program 5032 in the non-volatile storage medium 503. The computer program 5032, when executed by the processor 502, may cause the processor 502 to perform the wine label recognition method, the wine information management method applied to a server side, or the wine information management method applied to a terminal. The network interface 505 is configured to perform network communication with another device. A person skilled in the art may understand that, the structure shown in FIG. 10 is merely a block diagram of a structure of a part related to a solution of this application, and does not constitute any limitation on the computer device 500 to which the solution of this application is applied. A specific computer device 500 may include more or fewer components than those shown in the figure, or some components may be combined, or a different component deployment may be used. For example, in some embodiments, the computer device may include only a memory and a processor. In such an embodiment, structures and functions of the memory and the processor are the same as those in the embodiment shown in FIG. 10, and details are not described herein again.

In one embodiment, when the processor 502 is configured to run the computer program 5032 stored in the memory, to implement the wine label recognition method, the processor 502 performs the following steps: obtaining a wine image, and performing OCR on the wine image in a preset OCR manner, to obtain text included in the wine image; performing deep learning recognition on the wine image in a preset deep learning recognition manner, to obtain an image feature included in the wine image; and sifting out a target wine label matching the text and the image feature from a preset wine label database according to the text and the image feature, and using the target wine label as a wine label corresponding to the wine image.

In one embodiment, when implementing the step of sifting out a target wine label matching the text and the image feature from a preset wine label database according to the text and the image feature, and using the target wine label as a wine label corresponding to the wine image, the processor 502 specifically implements the following steps:
sifting out preset wine labels matching the text from the preset wine label database according to the text, and combining the preset wine labels into a collection to obtain a target wine label collection; and sifting out a wine label with a highest matching degree with the image feature from the target wine label collection according to the image feature as the target wine label, and using the target wine label as a wine label corresponding to the wine image.

In one embodiment, the wine image includes a plurality of images of the same target wine, and when implementing the step of using the target wine label as a wine label corresponding to the wine image, the processor 502 specifically implements the following step:
using a target wine label corresponding to each image as a wine label corresponding to the image; and
after implementing the step of using a target wine label corresponding to each image as a wine label corresponding to the image, the processor 502 further implements the following steps:
classifying wine labels belonging to the same wine label among all the wine labels respectively corresponding to the images into the same type of wine labels; counting the number of wine labels included in each same type of wine labels; and selecting, according to the number of wine labels included in each same type of wine labels, a wine label with the largest value among all the same types of wine labels as a target wine label corresponding to the target wine.

In one embodiment, when the processor 502 is configured to run the computer program 5032 stored in the memory, to implement the wine information management method applied to a server side, the processor 502 performs the following steps: obtaining wine information, where the wine information includes a wine image; performing recognition on the wine image according to the wine label recognition method described in the foregoing embodiment to obtain a wine label included in the wine image; and managing the wine information based on the wine label.

In one embodiment, when the processor 502 is configured to run the computer program 5032 stored in the memory, to implement the wine information management method applied to a terminal, the processor 502 performs the following steps: sending a wine information obtaining request to a preset server in response to an operation of a user, so that the preset server obtains target wine information corresponding to the wine information obtaining request according to the wine information obtaining request, and returns the target wine information to the terminal, where the target wine information includes wine information associated based on a preset wine label, and the preset wine label is obtained by performing recognition on a wine image according to the wine label recognition method described in the foregoing embodiment; receiving the target wine information sent by the preset server; and displaying the target wine information, so that the user obtains the target wine information.

It should be understood that, in this embodiment of this application, the processor 502 may be a central processing unit (CPU), or the processor 502 may be another general-purpose processor, digital signal processor (DSP), application-specific integrated circuits (ASIC), or field programmable gate array (FPGA), or another programmable logic device, discrete gate or transistor logic device, a discrete hardware components, or the like. The general-purpose processor may be a microprocessor, or any conventional processor, or the like.

A person of ordinary skill in the art can understand that all or part of the processes in the methods of the above embodiments may be implemented by a computer program, and the computer program may be stored in a computer-readable storage medium. The computer program is executed by at least one processor in a computer system to implement the steps of the processes in the above method embodiments.

Therefore, this application further provides a computer-readable storage medium. The computer-readable storage medium may be a non-volatile computer-readable storage medium or a volatile computer-readable storage medium. The computer-readable storage medium stores a computer program. The computer program, when executed by a processor, causes the processor to perform the steps in the wine label recognition method described in the foregoing embodiments, or causes the processor to perform the wine information management method applied to a server side described in the foregoing embodiments, or causes the processor to perform the wine information management method applied to a terminal described in the foregoing embodiments.

The computer-readable storage medium may be an internal storage unit of the foregoing device, such as a hard disk or a memory of the device. The computer-readable storage medium may alternatively be an external storage device of the device, such as a plug-in hard disk equipped on the device, a smart memory card (SMC), a secure digital (SD) card, or a flash card. Further, the computer-readable storage medium may include both an internal storage unit of the device and an external storage device.

It may be clearly understood by a person skilled in the art that, for the purpose of convenient and brief description, for a detailed working process of the foregoing device, apparatus, and unit, reference may be made to a corresponding process in the foregoing method embodiments, and details are not described herein again.

The storage medium is a physical, non-transitory storage medium, such as a USB flash drive, a removable hard disk, a read-only memory (ROM), a magnetic disk, an optical disc, or various physical storage mediums that can store computer programs.

A person of ordinary skill in the art may be aware that, in combination with the examples described in the embodiments disclosed in this specification, units and algorithm steps can be implemented by electronic hardware, computer software, or a combination of the two. To clearly describe the interchangeability between the hardware and the software, compositions and steps of each example have been generally described in the foregoing specification based on functions. Whether the functions are performed by hardware or software depends on particular applications and design constraint conditions of the technical solutions. A person skilled in the art can use different methods to implement the described functions for each particular application, but it should not be considered that the implementation goes beyond the scope of this application.

In the several embodiments provided in this application, it should be understood that the disclosed apparatus and method may be implemented in other manners. For example, the apparatus embodiments described above are illustrative only. For example, the division of the units is merely a logical function division. In an actual implementation, there may be another division manner. For example, a plurality of units or components may be combined or integrated into another system, or some features may be ignored or may not be performed.

The steps in the methods of the embodiments of this application may be rearranged, combined, and deleted according to actual needs. The units in the apparatuses of the embodiments of this application may be combined, divided, and deleted according to actual needs. In addition, functional units in the embodiments of this application may be integrated into one processing unit, or each of the units may exist alone physically, or two or more units may be integrated into one unit.

When the integrated unit is implemented in the form of a software functional unit and sold or used as an independent product, the integrated unit may be stored in a storage medium. Based on such an understanding, the technical solutions of this application essentially, or the part contributing to the related art, or some of the technical solutions may be implemented in a form of a software product. The computer software product is stored in a storage medium, and includes a plurality of instructions for instructing an electronic device (which may be a personal computer, a terminal, a network device, or the like) to perform all or some of the steps of the methods described in the embodiments of this application.

The foregoing descriptions are merely specific implementations of this application, but are not intended to limit the protection scope of this application. Any variation or replacement readily figured out by a person skilled in the art within the technical scope disclosed in this application should fall within the protection scope of this application. Therefore, the protection scope of this application should be subject to the protection scope of the claims.

What is claimed is:

1. A wine label recognition method, comprising:
    obtaining a wine image, and performing optical character recognition (OCR) on the wine image in a preset OCR manner, to obtain text comprised in the wine image;

performing deep learning recognition on the wine image in a preset deep learning recognition manner, to obtain an image feature comprised in the wine image; and sifting out a target wine label matching the text and the image feature from a preset wine label database according to the text and the image feature, and using the target wine label as a wine label corresponding to the wine image, comprising:

counting a text similarity between the text and preset wine label text corresponding to an existing preset wine label in the preset wine label database;

determining whether the text similarity is greater than or equal to a preset text similarity threshold;

using the preset wine label text as target text, and using the target text as text corresponding to the wine image in a case where the text similarity is greater than or equal to the preset text similarity threshold;

sifting out preset wine labels matching the text from the preset wine label database according to the text, and combining the preset wine labels into a collection to obtain a target wine label collection;

sifting out a wine label with a highest matching degree with the image feature from the target wine label collection according to the image feature as the target wine label, and using the target wine label as a wine label corresponding to the wine image; wherein the wine image comprises a plurality of images of the same target wine;

using a target wine label corresponding to each image as a wine label corresponding to the image;

classifying wine labels belonging to the same wine label among all the wine labels respectively corresponding to the images into the same type of wine labels;

counting the number of wine labels comprised in each same type of wine labels; and selecting, according to the number of wine labels comprised in each same type of wine labels, a wine label with the largest value among all the same types of wine labels as a target wine label corresponding to the target wine;

wherein the step of sifting out a wine label with a highest matching degree with the image feature from the target wine label collection according to the image feature as the target wine label, and using the target wine label as a wine label corresponding to the wine image comprises:

counting an image similarity between the image feature and a preset wine label included in the target wine label collection to obtain all the image similarities;

sifting out a target image similarity with the highest image similarity among all the image similarities;

determining whether the target image similarity is greater than or equal to a preset image similarity threshold; and using a preset wine label corresponding to the target image similarity as the target wine label, and using the target wine label as the wine label corresponding to the wine image in a case where the target image similarity is greater than or equal to the preset image similarity threshold.

2. A wine information management method, applied to a terminal, and comprising:

sending a wine information obtaining request to a preset server in response to an operation of a user, so that the preset server obtains target wine information corresponding to the wine information obtaining request according to the wine information obtaining request, and returns the target wine information to the terminal, wherein the target wine information comprises wine information associated based on a preset wine label, and the preset wine label is obtained by performing recognition on a wine image according to the wine label recognition method according to claim 1;

receiving the target wine information sent by the preset server; and displaying the target wine information, so that the user obtains the target wine information.

3. A computer device, comprising a memory and a processor connected to the memory, wherein the memory is configured to store a computer program, and the processor is configured to run the computer program to perform the steps in the method according to claim 1.

* * * * *